(12) United States Patent
Duyck et al.

(10) Patent No.: US 9,415,574 B2
(45) Date of Patent: Aug. 16, 2016

(54) METHOD FOR MANUFACTURING A PLATE SHAPED PRODUCT AND PLATE SHAPED PRODUCT MANUFACTURED THEREBY

(75) Inventors: Stefaan Gerard Lucien Duyck, Izegem (BE); Kristof Van Vlassenrode, Deinze (BE); Filip Gilbert Lucien Bossuyt, Avelgem (BE); Stijn Michel Vermeulen, Aarsele (BE)

(73) Assignee: IVC N.V., Avelgem (BE)

( * ) Notice: Subject to any disclaimer, the term of this patent is extended or adjusted under 35 U.S.C. 154(b) by 1051 days.

(21) Appl. No.: 13/363,874

(22) Filed: Feb. 1, 2012

(65) Prior Publication Data

US 2012/0196098 A1 Aug. 2, 2012

(30) Foreign Application Priority Data

Feb. 1, 2011 (EP) ..................................... 11152888

(51) Int. Cl.
*B32B 3/10* (2006.01)
*B32B 37/02* (2006.01)
(Continued)

(52) U.S. Cl.
CPC ................. *B32B 37/02* (2013.01); *B32B 27/12* (2013.01); *D06N 3/06* (2013.01); *E04F 13/0871* (2013.01); *B32B 2255/02* (2013.01); *B32B 2255/26* (2013.01); *B32B 2255/28* (2013.01);
(Continued)

(58) Field of Classification Search
CPC ............. B32B 37/02; B32B 2307/734; B32B 2327/06; B32B 2471/00; B32B 27/12; B32B 2255/02; B32B 2255/26; B32B 2255/28; B32B 2262/101; B32B 2419/04; B32B 5/24; B32B 2307/546; Y10T 428/24851; Y10T 156/1052; D06N 3/06; D06N 2211/066; D06N 7/0049; B29C 70/086; B29C 77/32; B29C 44/32; E04F 13/0871
USPC .................. 428/201; 156/250, 280, 278, 279; 442/62, 72, 148, 369
See application file for complete search history.

(56) References Cited

U.S. PATENT DOCUMENTS 4,138,521 A * 2/1979 Brown .......................... 428/159
4,217,385 A * 8/1980 Shortway et al. ............. 428/159
(Continued)

FOREIGN PATENT DOCUMENTS

FR 2805549 A1 8/2001

OTHER PUBLICATIONS

"European Application No. 11 152 888.1, Communication pursuant to Article 94(3) EPC dated Nov. 13, 2014", 5 pgs.
"European Application No. 11152888.1, Extended European Search Report dated Jul. 20, 2011", 6 pgs.

*Primary Examiner* — Jacob T Minskey
*Assistant Examiner* — Vishal I. Patel
(74) *Attorney, Agent, or Firm* — Schwegman, Lundberg & Woessner, P.A.

(57) ABSTRACT

A method is presented for manufacturing a plate shaped product, comprising the steps of manufacturing a first intermediate product which comprises at least, successively, a carrier, a plastic printing layer, a decorative print layer and a plastic protective layer, by using a multiple coating process, manufacturing a second intermediate product which comprises at least one plastic layer, by using at least a calendering process, and combining the first and second intermediate products by laminating, such that the second intermediate product is attached to the first intermediate product. Further a plate shaped product is provided which is manufactured using said method.

20 Claims, 1 Drawing Sheet

(51) Int. Cl.
*D06N 3/06* (2006.01)
*B32B 27/12* (2006.01)
*E04F 13/08* (2006.01)

(52) U.S. Cl.
CPC ..... *B32B2262/101* (2013.01); *B32B 2307/546* (2013.01); *B32B 2307/734* (2013.01); *B32B 2327/06* (2013.01); *B32B 2419/04* (2013.01); *B32B 2471/00* (2013.01); *D06N 2211/066* (2013.01); *Y10T 156/1052* (2015.01); *Y10T 428/24851* (2015.01)

(56) References Cited

U.S. PATENT DOCUMENTS

| | | | |
|---|---|---|---|
| 4,698,258 | A * | 10/1987 | Harkins, Jr. .................. 442/373 |
| 6,511,926 | B1 * | 1/2003 | Kauffman et al. .............. 442/62 |
| 2004/0102120 | A1 * | 5/2004 | Plusquellec et al. .......... 442/370 |
| 2007/0166516 | A1 * | 7/2007 | Kim et al. ..................... 428/172 |
| 2007/0286982 | A1 * | 12/2007 | Higgins et al. ................. 428/95 |
| 2008/0010930 | A1 * | 1/2008 | Mao ............................ 52/403.1 |
| 2008/0138560 | A1 * | 6/2008 | Windmoller ................... 428/46 |

\* cited by examiner

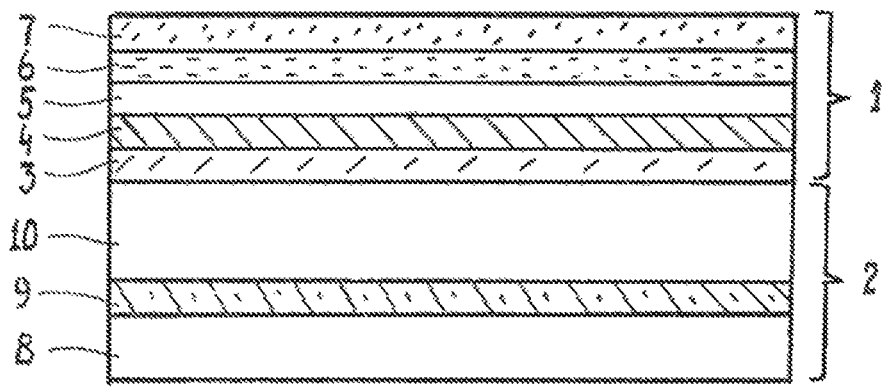

METHOD FOR MANUFACTURING A PLATE SHAPED PRODUCT AND PLATE SHAPED PRODUCT MANUFACTURED THEREBY

CLAIM OF PRIORITY

This application claims the benefit of priority under 35 U.S.C. §119 (a)-(d) of European Patent Application Serial Number 11152888.1, entitled "METHOD FOR MANUFACTURING A PLATE SHAPED PRODUCT AND PLATE SHAPED PRODUCT MANUFACTURED THEREBY," filed on Feb. 1, 2011, the benefit of priority of which is claimed hereby, and which is incorporated by reference herein in its entirety.

TECHNICAL FIELD

The invention firstly relates to a method for manufacturing a plate shaped product, especially a plate shaped product which mainly comprises plastic materials. The term "plate shaped product" may refer to various products, such as floor products, wall products, ceiling products or alike.

BACKGROUND

To date there exist several methods for manufacturing such a plate shaped product, such as for example a floor product. A first typical method for manufacturing a (mainly plastic) floor product in roll shape is described in patent application US-A-2004/0102120. According to this known method a continuous multiple coating process is carried out to apply several layers on top of each other.

Typically such layers may comprise a plastic backing layer, a carrier, a plastic printing layer, a decorative print layer and a plastic protective layer. The roll shaped floor product obtained may be converted into modular floor products. This known coating method generally produces highly flexible and soft floor products. Such a flexibility is inherent to the coating method which uses plastisols with a low viscosity which is controlled by a number of liquids in the plastisol, such as plasticizers, diluents and additives. During a subsequent gelling process the plastisols act and the separate layers are interconnected. The plasticizers act as softeners for keeping the final floor product flexible.

Patent application US-A-2007/0166516 describes another typical method for producing (mainly plastic) modular floor products by calendering and laminating techniques. According to this known method several continuous sheet or foil shaped layers are produced by calendering, whereafter these layers are laminated together using a continuous laminating process.

As an alternative for this known continuous laminating a so-called hot press method may be used which defines a discontinuous laminating process using short slabs cut from the produced sheet or foil shaped layers.

BRIEF SUMMARY OF THE INVENTION

Both the continuous and discontinuous processes suffer from a number of drawbacks. The processes involve high capital cost. To produce the several sheet or foil shaped layers (e.g. backing layer, printing layer and wear layer) multiple calender lines are required which each should be provided, with a melting unit (e.g. an extruder) and a dry blend mixing unit, adding to the cost. Further a separate printing line will be needed. Finally an intermediate storage for the sheet or foil shaped layers on a roll should be provided for.

Using this known method floor products are obtained which generally are harder and stiffer than the floor products obtained by the coating method. However, the most calendered and laminated floor products thus obtained have a poor dimensional stability and often show shrinkage phenomena and a rest stability which sometimes call for additional annealing steps (however without fully preventing any residual shrinkage).

In view of the above it is an object of the present invention to provide an improved method for manufacturing a plate shaped product.

In accordance with the present invention such a method is characterized by the steps of:
- manufacturing a first intermediate product which comprises at least, successively, a carrier, a plastic printing layer, a decorative print layer and a plastic protective layer, by using a multiple coating process,
- manufacturing a second intermediate product which comprises at least one plastic layer, by using at least a calendering process,
- combining the first and second intermediate products by laminating, such that the second intermediate product is attached to the first intermediate product.

The method according to the present invention combines the advantages of the coating process at one hand and the calendering process at the other hand. Thus, the product obtained by the method will not or only in a limited sense show the disadvantages of the products obtained by the above mentioned known methods. The first intermediate product offers the final plate shaped product an excellent dimensional stability due to the presence of the carrier, whereas the second intermediate product makes the final product sufficiently stiff to present it in a modular shape, if required.

In an embodiment of the method according to the present invention the first intermediate product is manufactured with a plastic backing layer at the side of the carrier opposite the plastic printing layer and the second intermediate product is attached to said backing layer.

In a preferred embodiment of the method according to the present invention at least one of the protective layer and backing layer, if provided, of the first intermediate product are provided with a surface structure produced by mechanically embossing. Such a mechanical embossing is an alternative for chemical embossing (such as for example a standard foaming process for the printing layer) and is often used for structures out of register with the print. Chemical embossing is applied in register with the print, but generally will yield a more shallow and less accurate structure. In most cases only the protective layer will be embossed mechanically.

In an embodiment, then, both the protective layer and backing layer of the first intermediate product are provided with a surface stricture produced by mechanically embossing.

However, as an alternative it is possible too that both the protective layer and backing layer of the first intermediate product are provided with a surface structure entirely produced by gelling.

In accordance with yet another preferred embodiment of the method according to the present invention, for manufacturing the protective layer of the first intermediate product a thermic cross linking process is used during a gelling process. As a result a very hard protective wear layer (e.g. comprising PVC) may be obtained. This may be an important requirement for, for example, a floor product (e.g. a floor tile). According to such a thermic cross linking part of the plasticizers normally present in the wear layer may for example be substituted by reactive methacrylates or other reactive components) and an inflator. Latter will be activated at high temperature and initiates a cross linking. Apart from the gelling process during which the plasticizers diffuse into the plastic (PVC) grains and cause the wear layer to harden, an additional cross linking between the methacrylates among themselves and between the methacrylates and the PVC chains occurs. This results in a wear layer (protective layer) which is very hard.

As an alternative, however, it is possible too that for manufacturing the protective layer of the first intermediate product a foil is laminated on top of the decorative print layer.

According to another embodiment of the present method the carrier of the first intermediate product is impregnated with a plastic material, e.g. PVC, before being attached to an adjoining layer by said coating process. Such an impregnating step may improve the efficiency of the method. The impregnation layer will define a basis for the subsequent (plastic or plastisol) layers.

In such a case, as a further improvement of said method, the carrier, after being impregnated, may be heated for pre-gelling the plastic material.

When, in accordance with yet another embodiment, the method according to the present invention comprises the further step of providing a protective lacquer layer on top of the protective layer, the life span of the protective layer (and thus of the plate shaped product) may be prolonged.

In a further embodiment of the method the step of manufacturing a second intermediate product further comprises the step of laminating together layers. This encompasses both the possibilities of creating a layer by laminating sub layers or creating an assembly of layers for obtaining the second intermediate product.

According to another embodiment of the present invention the step of manufacturing a second intermediate product comprises providing a carrier and two calendered backing layers laminated at opposite sides of said carrier. As a result a final plate shaped product will be obtained comprising two carriers: a first one in the first intermediate product and a second one in the second intermediate product, which together offer the final plate shaped product an excellent dimensional stability (for example the flatness of the product can be increased and shrink reduced).

The backing layers laminated at opposite sides of said carrier may have a different composition and/or thickness, but it is possible too that the backing layers laminated at opposite sides of said carrier have a similar composition and/or thickness. Each backing layer further may comprise a single layer or a composite layer.

In another embodiment of the method the step of manufacturing a second intermediate product comprises providing at least one, and preferably two or more foils, possibly without carrier. Such an embodiment may be useful especially when a very thick final plate shaped product, such as a floor product is required.

The final plate shaped product obtained thus may come in different shapes. For example the method may further comprise the step of cutting the product to size after the step of combining the first and second intermediate products, for example for obtaining products like tile or plank shaped floor products.

The method according to the present invention further may comprise the step of providing the plate shaped product with edge groove and/or connector provisions. Connector provisions may be needed, for example, for interconnecting adjacent floor products and may comprise snap provisions as is known per se.

Without pretending to be complete, the following embodiments may be mentioned too: as carrier in the first intermediate product a non woven glass fiber carrier may be used, whereas as carrier in the second intermediate product a woven or non woven carrier may be used which may be based on glass fiber material; a step may be used of providing a surface structure in the protective layer and/or backing layer of the first intermediate product and/or the side of the second intermediate product facing away from the first intermediate product, wherein such a step of providing a surface structure may be carried out by chemical embossing (i.e. providing an embossed pattern by a localized expansion of a layer of foam); a step may be used of providing a slip resistant coating or an adhesive coating covered with a release foil on the side of the second intermediate product facing away from the first intermediate product.

In a second aspect the present invention relates to a plate shaped product comprising, on top of each other, a first intermediate product which comprises at least, successively, a carrier, a plastic printing layer, a decorative print layer and a plastic protective layer each coated one on top of the other, and a second intermediate product attached to said first intermediate product and comprising at least one calendered plastic layer, which plate shaped product is manufactured using the method according to the present invention.

In one embodiment of the plate shaped product it further comprises a plastic backing layer at the side of the carrier opposite the plastic printing layer. Further it is possible that the second intermediate product comprises at least one, and preferably two or more foils, possibly without carrier.

In another embodiment of said plate shaped product the second intermediate product comprises a carrier and two backing layers laminated at opposite sides of said carrier. The carrier in the first intermediate product may be a non woven glass fiber carrier, whereas the carrier in the second intermediate product may be a woven or non woven carrier which may be based on glass fiber material, and of which the position is selected such that the dimensional stability (such as flatness) is augmented in an optimal manner.

Further it is possible that a slip resistant coating or an adhesive coating covered with a release foil is provided on the side of the second intermediate product facing away from the first intermediate product.

The plate shaped product according to the present invention may have the shape of a floor tile or floor plank or may be provided in a roll form.

BRIEF DESCRIPTION OF THE DRAWING

Hereinafter the invention will be elucidated while referring to drawing.

FIG. 1 shows a schematic cross section of an embodiment of a plate shaped product embodied as a floor product in accordance with the present invention.

DETAILED DESCRIPTION

Referring to the drawing, an embodiment of floor product in accordance with the present invention is illustrated in a schematic cross section (it is noted that this cross section is not necessarily to scale and that the relative dimensions of its constitutive parts may differ from what has been illustrated). This floor product comprises a first upper intermediate product 1 and a lower second intermediate product 2 manufactured separately and thereafter joined together in manners to be described hereafter.

In the illustrated embodiment the first upper intermediate product 1 comprises, successively, a PVC plastisol backing layer 3, a non woven glass fiber carrier 4, a PVC plastisol printing layer 5, a decorative print layer 6 and a PVC plastisol protective layer 7. These layers are positioned one on top of the other using a multiple coating process. Each layer has its specific composition, thickness, weight and function in the final floor product. The most important constituents of the plastisols are PVC, fillers, plasticizers, viscosity controllers, stabilisers and foaming means.

A first step for manufacturing the first intermediate product 1 may comprise impregnating a glass fiber carrier 4 with a first PVC paste. Next the impregnated carrier is transported over a heated roller for pre-gelling (harden) the liquid paste. As a next step the printing layer 5 is coated on top of the impregnated carrier 4. The printing layer 5, which will define the basis for the decorative print layer 6, may comprise a white foam layer.

On top of the printing layer 5 the decorative print layer 6 is provided, e.g. by an appropriate printing technique (such as rotative engraved printing). The used inks may comprise an inhibitor inhibiting the foaming of the printing layer 5 for locally creating a relief (such as a seam in a tile shaped floor product). Finally the protective layer 7 will be coated on top of the decorative print layer 6. Mostly the protective layer 7 will be a transparent PVC layer which offers the floor product important mechanical properties.

Preferably, for manufacturing the protective layer 7 of the first intermediate product 1 a thermic cross linking process is used during a gelling process. As a result a very hard protective wear layer may be obtained. This may be an important requirement for a floor product (e.g. a floor tile). According to such a thermic cross linking part of the plasticizers normally present in the wear layer are substituted by reactive methacrylates and an intiator. Latter will be activated at high temperature and initiates a cross linking. Apart from the gelling process during which the plasticizers diffuse into the plastic (PVC) grains and cause the wear layer to harden, an additional cross linking between the methacrylates among themselves and between the methacrylates and the PVC chains occurs. This results in a wear layer (protective layer) which is very hard.

Additionally decorative particles may be dispersed into the protective layer 7.

It is possible to pre-gel the PVC plastisols in the printing layer 5 and protective layer 7 by a heated roller. Also the carrier 4 may be pre-gelled.

Next the backing layer 3 may be coated to the impregnated carrier 4, for example using a foaming technique (e.g. chemically, or mechanically, as is known per se). This backing layer 3 offers the final floor product the required comfort (resilience and damping).

Next the intermediate product 1 is placed in a hot air furnace (heated to for example 205° C.) for a few minutes and a complete gelling and foaming will occur. After cooling the floor product a laquer layer (not illustrated) may be applied on top of the protective layer 7. As an alternative the laquer layer is applied previously to gelling.

Finally the protective layer 7 and the backing layer 3 may be provided with a surface structure (for example by mechanically embossing).

The obtained first intermediate product 1 may be finished (among others by cutting it to size, removing edges) and may be stored until later laminating with the second intermediate product 2.

The second intermediate product 2 is not manufactured by coating techniques but by calendaring (and possibly laminating) processes using, among others, calendering (and laminating) rolls. In an exemplary embodiment of such calendaring processes firstly compounds based on PVC, mineral or organic fillers, plasticizers, additives and colorants are produced which are fed to an extruder. In the extruder a homogenisation and melting of the compound occurs. The extruded material is fed to the calendering rolls for producing PVC foils.

In the illustrated embodiment the second intermediate product 2 comprises a first compact calendered backing layer 8, a carrier 9 (which may be precoated, e.g. with a plastisol, for enhancing the adhesion with the calandered layers) and a second compact calendered backing layer 10. Each of the backings 8 and 10 may comprise several separately calendered layers (foils, but also foam layers), if required (for example for achieving a required minimal thickness) laminated together. The carrier 9 may comprise a woven or non woven carrier which may be based on glass fiber material.

The carrier 9 is fed to one or more laminating rolls, together with the backing layers 8 and 10 and the layers are laminated for obtaining the second intermediate product 2. It is possible to pre-heat the backing layers and/or carrier to improve the lamination, e.g. using infrared lights or heated rolls.

Once the first and second intermediate products 1 and 2 have been manufactured, these products are joined by a further lamination process for obtaining the final floor product. If necessary, finishing steps may be carried out (among which embossing the upper and lower side of the final product, cutting the product to size and the provision of connector provisions).

The invention is not limited to the embodiments described before which may be varied widely within the scope of the invention as defined by the appending claims.

What is claimed is:

1. A method for manufacturing a plate shaped product, the method comprising:
   manufacturing a first intermediate product which comprises at least, successively, a first carrier, a plastic printing layer, a decorative print layer and a plastic protective layer, by using a multiple coating process;
   compacting two backing layers using a calendering process to create two calendered backing layers;
   laminating the two calendered backing layers at opposites sides of a second carrier to create a second intermediate product, the second carrier comprising at least one plastic layer; and
   combining the first and second intermediate products by laminating, such that the second intermediate product is attached to the first intermediate product.

2. The method according to claim 1, wherein the first intermediate product is manufactured with a plastic backing layer at the side of the first carrier opposite the plastic printing layer, and wherein the second intermediate product is attached to said plastic backing layer.

3. The method according to claim 1, wherein at least one of the plastic protective layer and, if provided, backing layer of the first intermediate product are provided with a surface structure produced by mechanically embossing.

4. The method according to claim 3, wherein both the plastic protective layer and the backing layer of the first intermediate product are provided with a surface structure produced by mechanically embossing.

5. The method according to claim 2, wherein both the plastic protective layer and the backing layer of the first intermediate product are provided with a surface structure entirely produced by gelling.

6. The method according to claim 1, wherein for manufacturing the plastic protective layer of the first intermediate product a thermic cross linking process is used during a gelling process.

7. The method according to claim 1, wherein for manufacturing the plastic protective layer of the first intermediate product a foil is laminated on top of the decorative print layer.

8. The method according to claim 1, wherein the first carrier of the first intermediate product is impregnated with a plastic material before being attached to an adjoining layer by said coating process.

9. The method according to claim 8, wherein the first carrier, after being impregnated, is heated for pre-gelling the plastic material.

10. The method according to claim 1, comprising the further step of providing a protective lacquer layer on top of the plastic protective layer.

11. The method according to claim 1, wherein the step of manufacturing the second intermediate product further comprises the step of laminating together layers.

12. The method according to claim 1, wherein the calendered backing layers laminated at opposite sides of said second carrier have a different composition and/or thickness.

13. The method according to claim 1, wherein the calendered backing layers laminated at opposite sides of said second carrier have a similar composition and/or thickness.

14. The method according to claim 1, wherein the step of manufacturing the second intermediate product comprises providing at least one, and preferably two or more foils.

15. The method according to claim 1, further comprising the step of cutting the plate shaped product to size after the step of combining the first and second intermediate products.

16. The method according to claim 1, further comprising the step of providing the plate shaped product with edge groove and/or connector provisions.

17. The method according to claim 1, wherein as the first carrier in the first intermediate product a non woven glass fiber carrier is used, whereas as the second carrier in the second intermediate product a woven or non woven carrier is used which may be based on glass fiber material.

18. The method according to claim 1, further comprising the step of providing a surface structure in the plastic protective layer and/or the backing layer of the first intermediate product and/or the side of the second intermediate product facing away from the first intermediate product.

19. The method according to claim 18, wherein the step of providing the surface structure is carried out by chemical embossing.

20. The method according to claim 1, further comprising the step of providing a slip resistant coating or an adhesive coating covered with a release foil on the side of the second intermediate product facing away from the first intermediate product.

* * * * *